United States Patent Office 3,525,275
Patented Aug. 25, 1970

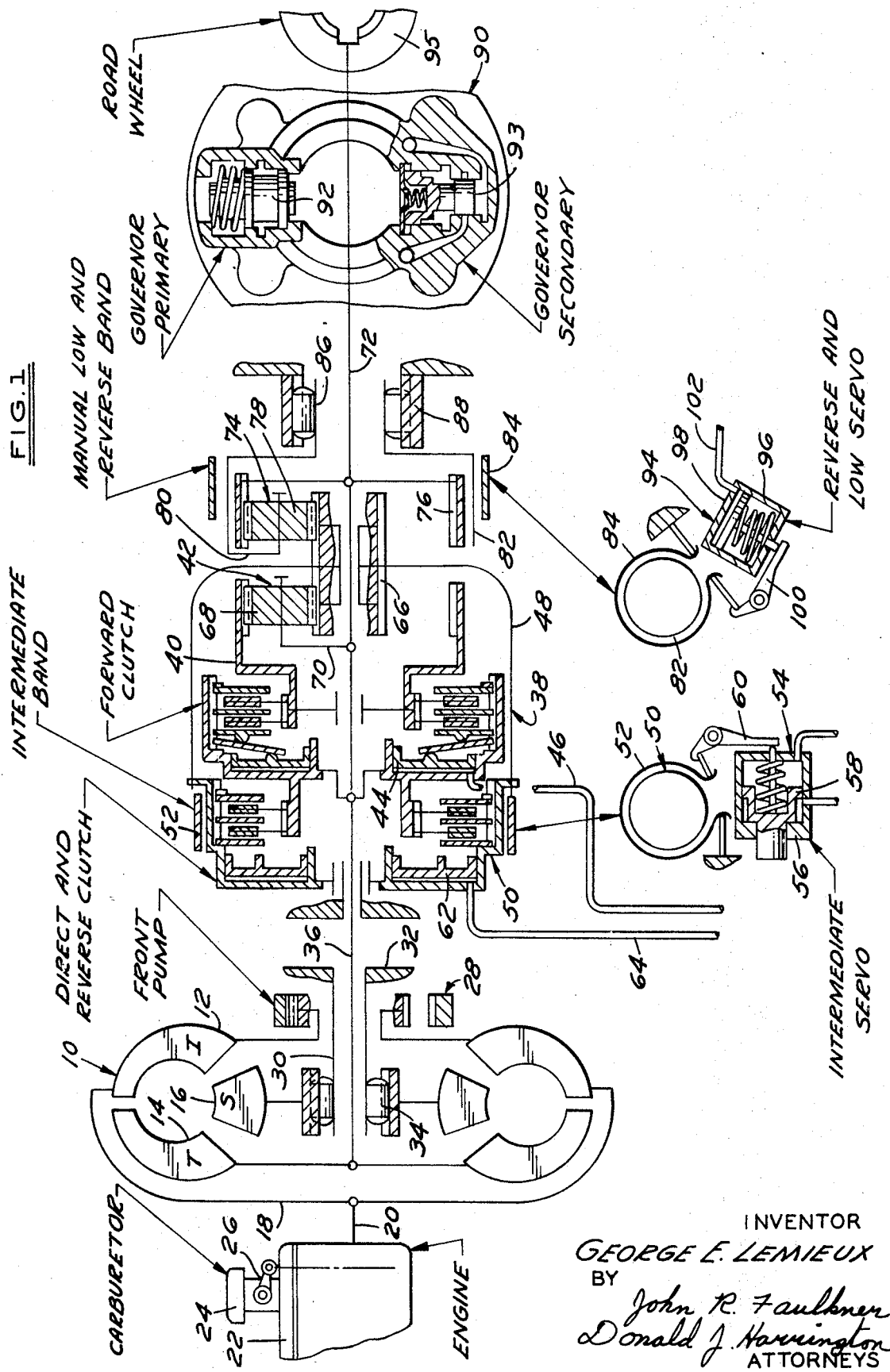

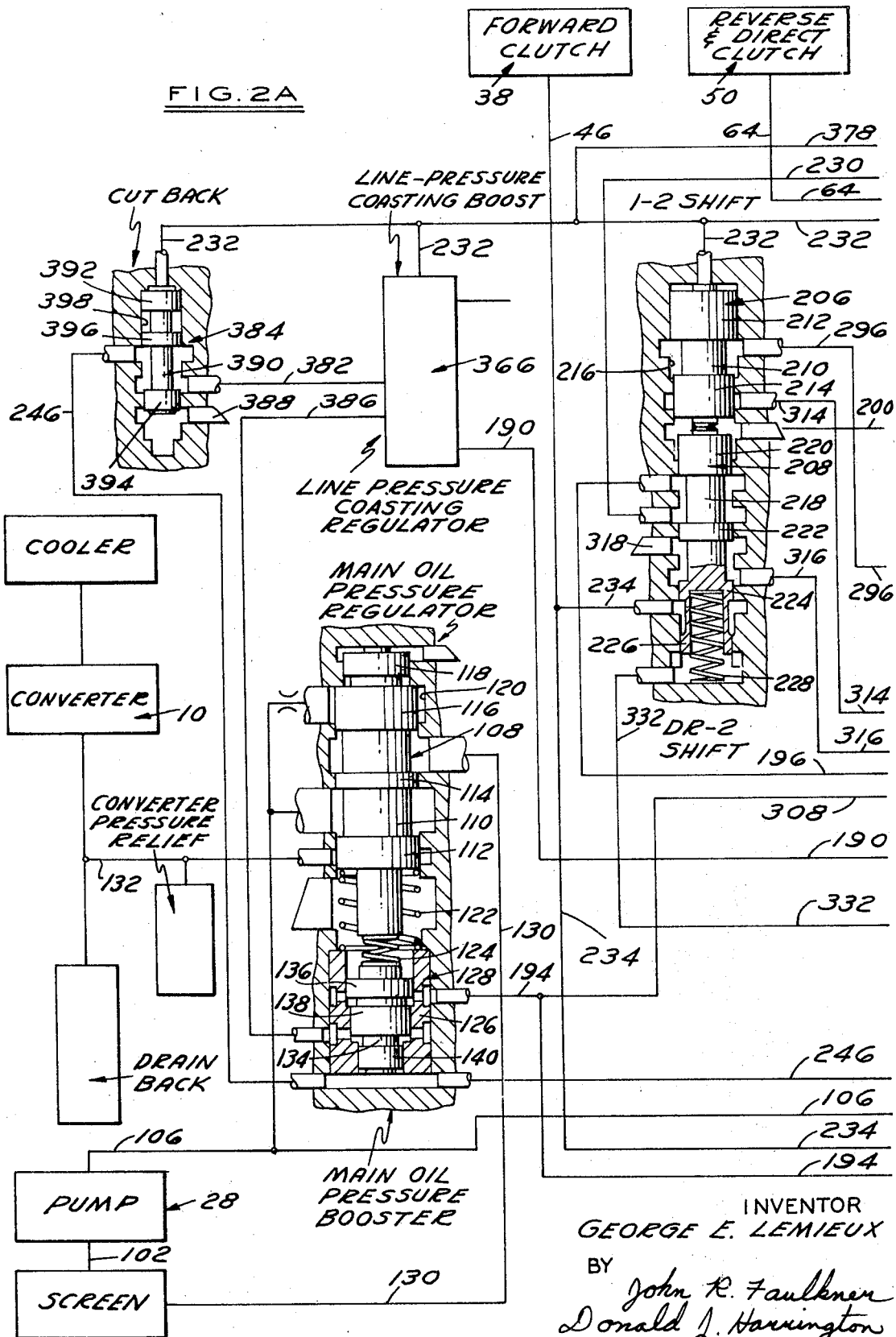

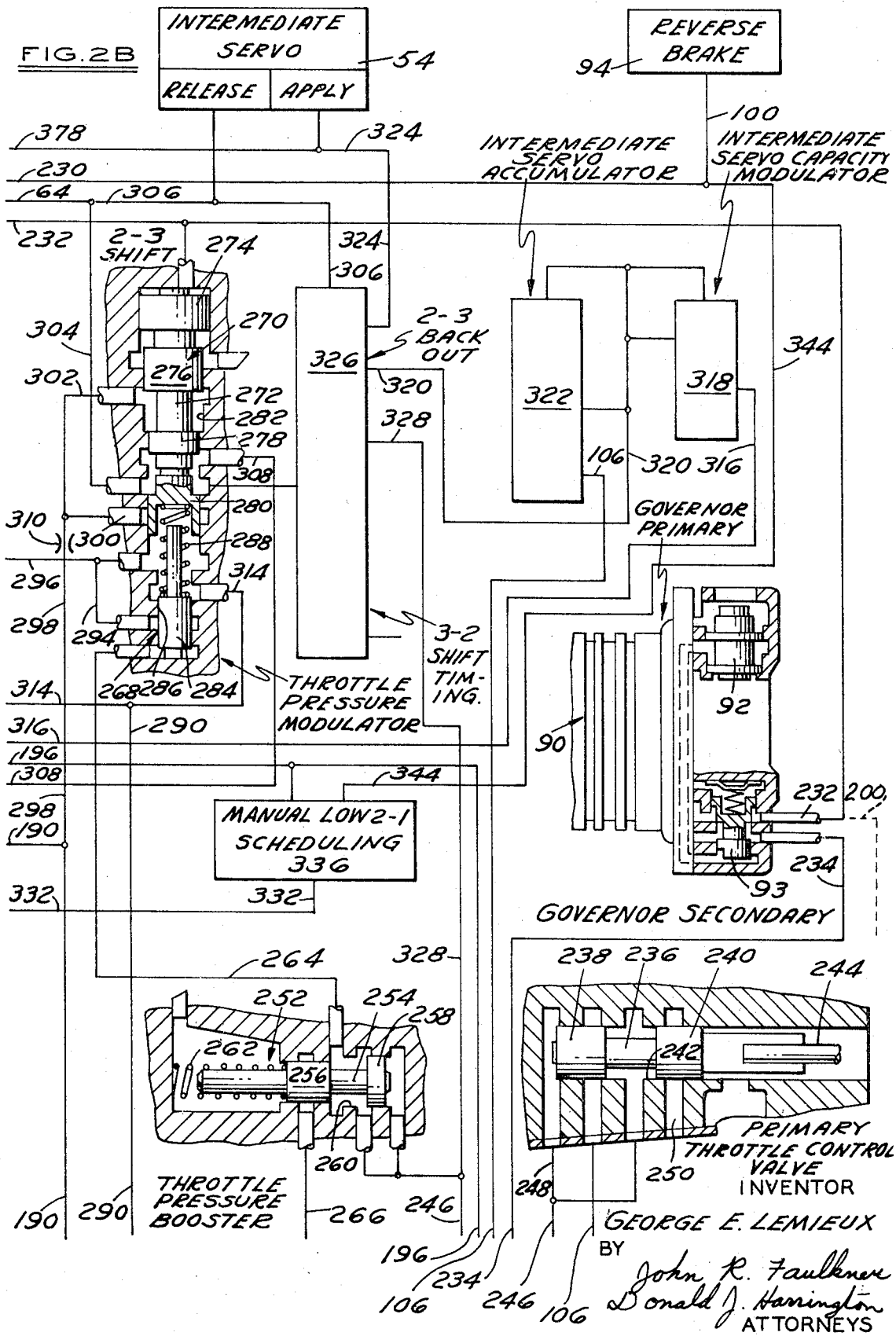

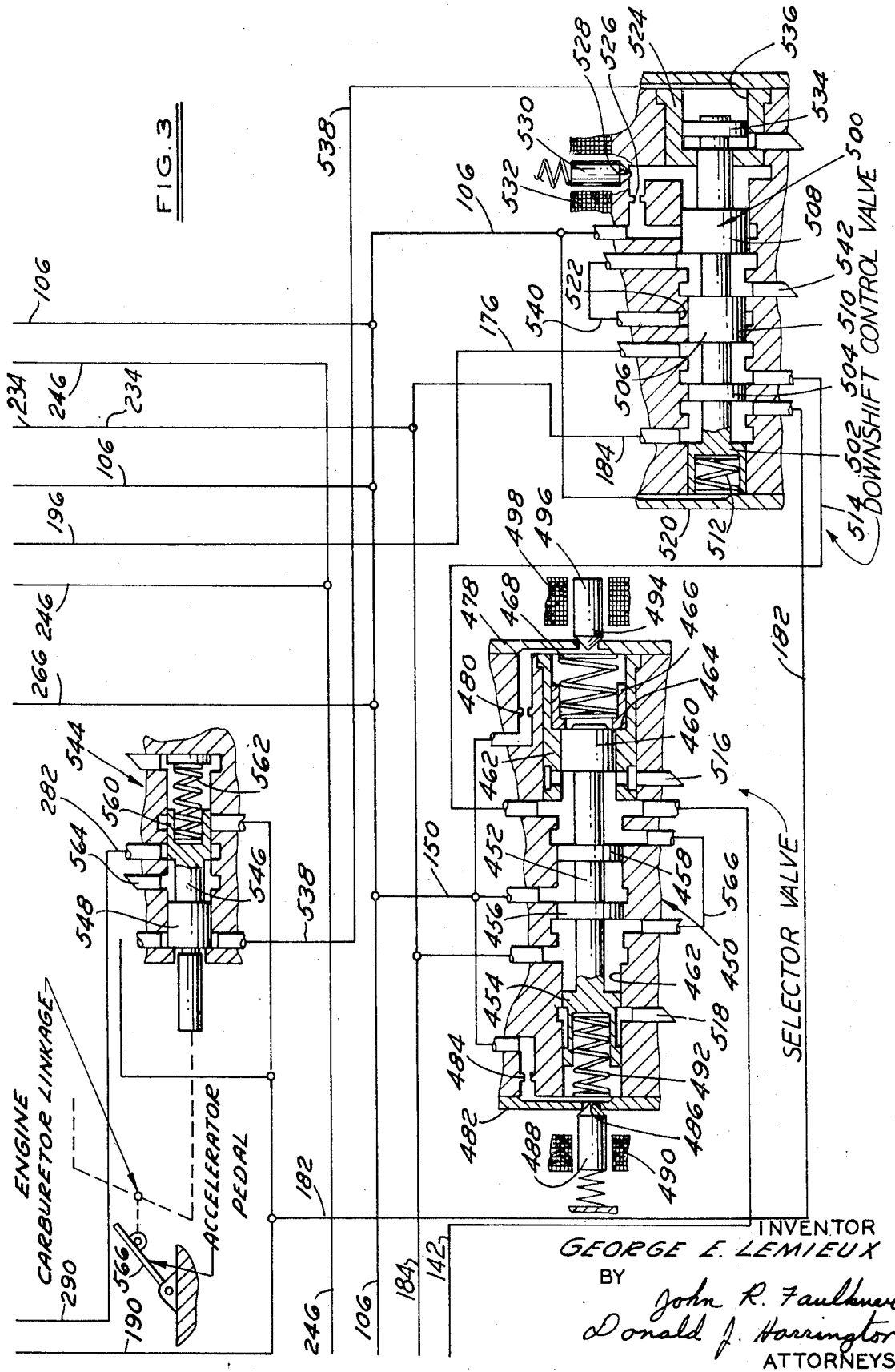

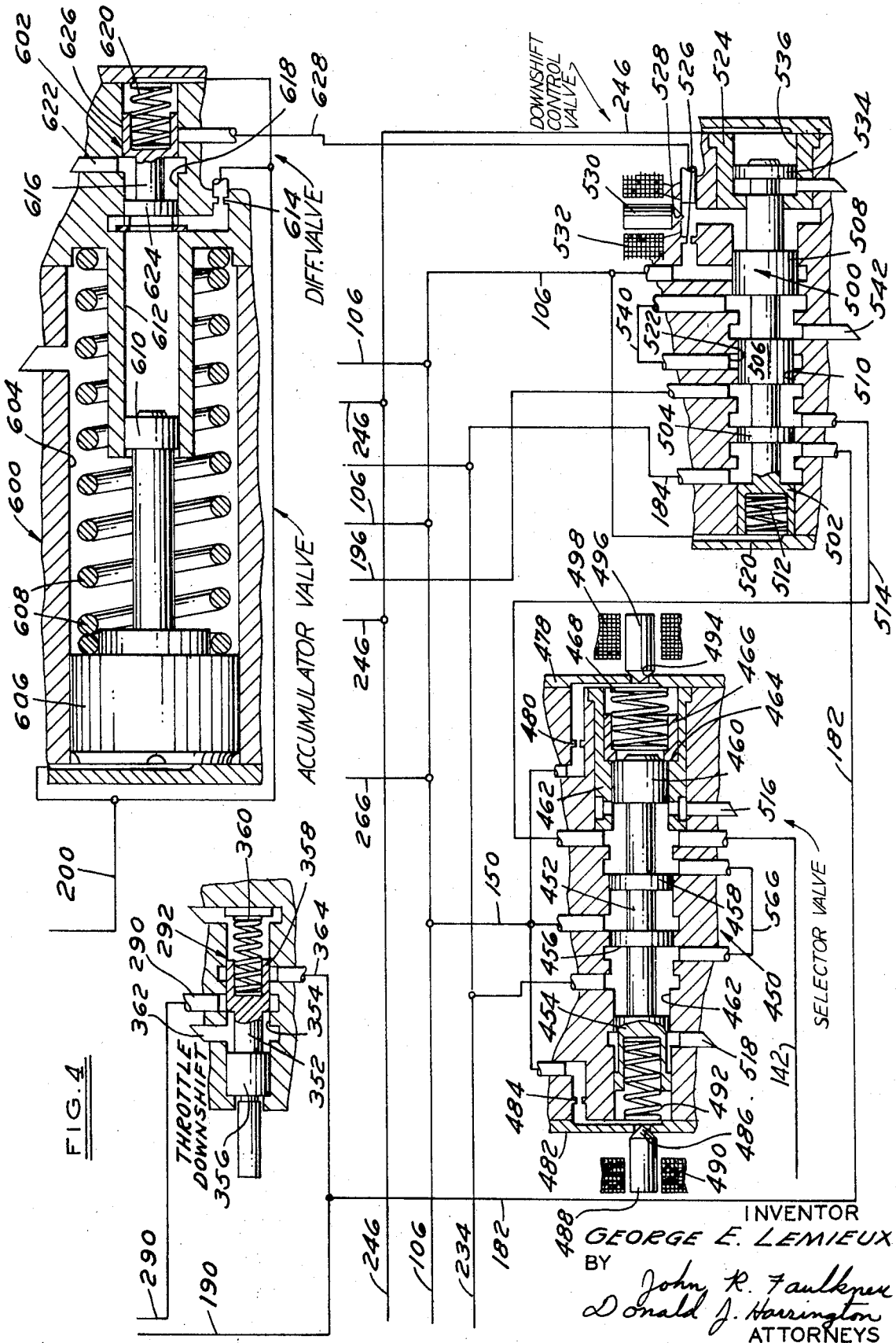

3,525,275
BRAKING DOWNSHIFT CONTROL VALVE SYSTEM FOR AN AUTOMATIC POWER TRANSMISSION MECHANISM
George E. Lemieux, Livonia, Mich., assignor to Ford Motor Company, Dearborn, Mich., a corporation of Delaware
Continuation of application Ser. No. 704,425, Feb. 9, 1968. This application June 12, 1969, Ser. No. 837,993
Int. Cl. B60k 17/04; G05g 1/00
U.S. Cl. 74—868        11 Claims

ABSTRACT OF THE DISCLOSURE

This specification describes an automotive vehicle driveline having multiple torque delivery paths, each having a separate different torque multiplication ratio extending between the internal combustion engine for the vehicle and the vehicle traction wheels. The torque delivery paths are defined by planetary gear elements. The relative motion of the gear elements is controlled by clutch and brake mechanisms that are actuated and released by fluid pressure operating servos.

Valve controlled conduit structure connects the servos with a fluid pressure source. The control system of which the conduit structure forms a part responds to engine torque and vehicle speed to initiate ratio changes. Torque is delivered in a forward drive operating mode from the engine to the traction wheels. During coasting, provision is made for overruling the automatic ratio controlling tendencies of the valve system. This is done by a braking downshift control, the operation of which is under the control of the vehicle operator.

This disclosure is a continuation of my copending application Ser. No. 704,425, filed Feb. 9, 1968, now abandoned.

GENERAL DESCRIPTION OF THE INVENTION

My invention is adapted especially to be used in an automatic control valve system such as that disclosed in copending application S.N. 518,882, now Pat. No. 3,400,612 filed by Stanley L. Pierce, Jr. on Jan. 5, 1966. That application is assigned to the assignee of this invention.

The control system of the copending Pierce disclosure includes fluid pressure operated servos that are adapted to control the relative motion of the planetary gear elements in the torque delivery paths. Pressure distribution to the servos is controlled by fluid pressure operated shift valves which respond to pressure signals that are proportional in magnitude to engine intake manifold pressure and to vehicle speed. As the vehicle accelerates from a standing start, the shift valves respond to changes in these pressure signals to initiate ratio changes and condition the mechanism for optimum performance during the acceleration period. During operation in a steady-state cruising condition, the transmission system assumes a one-to-one, direct-drive torque ratio. When the vehicle is coasting, with the vehicle traction wheels delivering torque to the engine, provision is made for overruling the action of the shift valves. This is done by a braking downshift control valve that distributes an auxiliary pressure signal to the shift valves to move the same to a downshift position. The braking downshift control valve, which is under the control of the vehicle operator, comprises a pressure sensitive valve element and a solenoid controlled orifice. A solenoid valve element controls the pressure drop across the orifice and is therefore effective to control the actuating pressure acting on the braking downshift control valve.

When the braking downshift control valve is in the downshift position, pressure is distributed to the shift valves thereby forcing the shift valves to assume an intermediate speed ratio position as the engine carburetor throttle is relaxed. This increases the engine braking characteristic.

When the vehicle operator then advances the engine carburetor throttle, the vacuum pressure signal increases. The increased signal is distributed to the braking downshift control valve to overrule the influence of the solenoid control orifice thereby restoring the braking downshift control valve to its inactive position. The shift valves thereby assume their automatic ratio controlling function.

In another embodiment of my invention, the braking downshift control valve is sensitive also to an increase in vehicle speed while the vehicle is in an engine braking mode. This is done by means of an accumulator valve and a governor pressure differentiating valve. When the vehicle is coasting at a constant speed, the output pressure signal of the accumulator valve and the governor pressure differentiating valve is effective to influence the braking downshift control valve. An increase in the coasting speed, however, will cause a signal to be distributed to the braking downshift control valve thereby causing the latter to assume the downshift position.

BRIEF DESCRIPTION OF THE FIGURES OF THE DRAWING

FIG. 1 shows in schematic form the torque converter and gearing arrangement for an automatic power transmission mechanism capable of using the improved control system of my invention.

FIG. 2a and 2b show in schematic form a control valve system capable of controlling the motion of the gear elements of the construction of FIG. 1.

FIG. 3 is a valve subassembly, which is a part of the circuit of FIGS. 2a and 2b, showing the transmission gear selector, the braking downshift control and the throttle downshift valve for the valve system of FIGS. 2a and 2b.

FIG. 4 shows an accumulator valve and a governor pressure differentiating valve for applying a pressure signal to the braking downshift control valve of the FIG. 3 construction.

PARTICULAR DESCRIPTION OF THE INVENTION

In FIG. 1, numeral 10 designates a hydrokinetic torque converter unit which comprises an impeller 12, a turbine 14 and a stator 16. These converter members, which are bladed, are situated in toroidal, fluid flow relationship in a common torus circuit. Stator 16 changes the tangential component of the absolute fluid flow velocity vector of the fluid that leaves the turbine thereby creating a hydrokinetic torque reaction. This reaction is distributed to a portion of the housing 32 through an over-running coupling 34 and a stationary stator sleeve shaft 30. Coupling 34 inhibits rotation of the stator in a direction opposite to the direction of rotation of the turbine and the impeller, but freewheeling motion in the other direction is permitted when the converter acts as a fluid coupling.

The impeller 12 is connected by means of a drive shell 18 to the crankshaft 20 for an internal combustion vehicle engine 22. This engine includes an air-fuel intake manifold that is supplied with a combustible mixture by a carburetor 24. An engine carburetor throttle valve shown in part at 26 controls the flow of combustible mixture to the engine intake manifold.

A positive displacement fluid pump 28 is drivably connected to the impeller 12 and is effective to supply fluid pressure whenever the engine is operating. Pump 28 acts as a pressure source for the control system that will be described with reference of FIGS. 2a, 2b and 3.

The turbine 14 is connected to a turbine shaft 36 which in turn may be connected to a ring gear 40 for a first simple planetary gear unit 42. A selectively engageable forward clutch 38 is provided for the purpose of establishing and interrupting a connection between shaft 36 and ring gear 40. Forward clutch 38 includes an internally splined clutch drum that defines an annular cylinder within which an annular piston 44 is situated. This annular piston and the annular cylinder cooperate to define a pressure cavity that is supplied with actuating fluid pressure by means of a feed passage 46. A drive shell 48 is connected to a clutch drum for a direct and reverse clutch 50.

A brake band 52 surrounding the drum may be applied and released selectively by means of an intermediate servo shown in FIG. 1 at 54. The servo includes a cylinder that receives a piston 58. The cylinder and the piston cooperate to define a pair of opposed fluid pressure chambers that may be supplied with actuating fluid by means of separate pressure feed passages as will be seen in the subsequent description. The pressure force acting upon piston 58 is transferred to the operating end of brake band 52 by means of a motion transmitting brake lever 60. The other end of the brake band 52 is anchored in a conventional fashion.

The drum for the direct and reverse clutch 50 defines an annular cylinder within which is received an annular piston 62. This piston and its cooperating cylinder define a working chamber that is supplied with fluid by means of a pressure feed passage 64.

A simple planetary gear unit 42 includes also a sun gear 66 which meshes with a set of planet pinions 68. These pinions are rotatably carried by a carrier 70 which is connected directly to a power output shaft 72.

Sun gear 66 forms also a part of a second simple planetary gear unit 74. This gear unit includes also a ring gear 76 and a set of planet pinions 78, the latter being journalled rotatably upon a carrier 80. Carrier 80, which defines a brake drum 82 about which is positioned a manual low and reverse brake band 84, can be adapted for accommodating driving torque reaction by means of an over-running coupling having brake rollers 86. These rollers are disposed between an inner race that is common to the carrier 80, and the outer race 88, the latter being cammed to provide cam surfaces that cooperate with the rollers 86 to inhibit rotation of the carrier 80 in one direction although freewheeling motion of the carrier 80 in the opposite direction is permitted. Race 88 is secured fast to the transmission housing.

A fluid pressure governor valve assembly 90 is drivably carried by power output shaft 72. It includes a primary governor valve 92 and a secondary governor valve 93, each valve being situated on opposed sides of the axis of rotation of the shaft 72. As will be explained subsequently, the primary governor valve inhibits the modulating action of the secondary governor valve at speeds of rotation of the shaft 72 that are less than a predetermined value. At any speed greater than that predetermined valve, the secondary governor valve is effective to establish a pressure signal that is proportional in magnitude to the speed of rotation of the shaft 72. The signal may be utilized by the automatic control valve system that will be described subsequently.

Shaft 72 can be connected to the vehicle road wheels 95 through a driveshaft and differential and axle assembly.

Brake band 84 is applied and released by means of a fluid pressure operated servo 94. The servo includes a cylinder 96 within which is positioned a fluid pressure operated piston 98. Cylinder 96 and piston 98 define a pressure chamber that can be supplied with control pressure through a feed passage 102. The fluid pressure force acting upon the piston 98 is transferred to the operating end of the brake band 84 by means of a brake operating lever shown in part at 100. The other end of the brake band 84 is anchored to the housing as indicated.

The transmission mechanism may be conditioned for continuous operation in the lowest speed-ratio by appropriately adjusting a manual valve to the low speed-ratio position as will be explained subsequently. This causes fluid pressure to be distributed to the pressure chamber for the reverse and low servo. The forward clutch 38 is applied during operation in the forward drive range in any speed-ratio. If both the brake band 84 and the clutch 38 are applied, the turbine torque delivered to the turbine shaft 36 is distributed through the engaged forward clutch 38 to ring gear 40. The driven shaft 72 to which the carriers 70 and 80 are connected tends to resist rotation. Thus, there is a tendency for sun gear 66 to rotate in a direction opposite to the direction of rotation of shaft 36. This, then, tends to cause carrier 80 to rotate in the same direction as the direction of rotation of sun gear 66. It is inhibited from doing so, however, both by the overrunning brake shown in part at 86 and also by the engaged brake band 84. The torque acting on the ring gear 76 then is in a forward driving direction. It supplements the driving torque of the carrier 70 so that a split torque delivery path is provided between the shaft 36 and the shaft 72.

Drive shell 48 which is connected directly to the sun gear 66 can be braked by applying the intermediate servo, thus establishing intermediate speed-ratio operation. Under these conditions, the brake band 84 is released while the clutch 38 remains applied. Clutch 50, of course, is released. The sun gear 66 functions as a reaction member during such intermediate speed-ratio operation, and the driving torque delivered to the ring gear 40 is multipled by the first planetary gear unit 42. The over-all speed-ratio then is greater than the lowest speed ratio, but it is less than unity. The overrunning coupling shown in part at 86 freewheels during such a speed-ratio change from the lowest speed-ratio to the intermediate speed-ratio.

To condition the mechanism for operation in the lowest speed-ratio during normal acceleration from a standing start, it is not necessary to apply brake band 84. The overrunning brake shown in part at 86 accommodates the forward acting torque, and upon application of the intermediate speed-ratio brake band 52 an automatic pick-up shift from the lowest speed-ratio to the highest speed-ratio is obtained. This is accomplished by the engagement of a single friction torque establishing device without the necessity for engaging or releasing a second friction torque establishing device.

A speed-ratio change from the intermediate speed-ratio to the direct drive, high speed-ratio is accomplished by releasing brake band 52 and applying both clutches 38 and 50 simultaneously. Brake band 52 is released by distributing pressure to the right-hand side of the piston 58. The brake band 52 is released when both pressure chambers of the intermediate servo are pressurized.

It will be seen, therefore, that the elements of the gear units will be caused to rotate in unison when both clutches are applied. A direct drive connection between shafts 36 and 72 then is provided.

Automatic speed-ratio changes can be accomplished in order to condition the driveline for various road conditions and for various operating demands. This is done by means of the automatic control valve system in co-pending application S.N. 518,882.

The reference characters used in FIGS. 2a, 2b and 3 are the same as those used in application S.N. 518,882.

The manual valve disclosed in the control system of applicaation S.N. 518,882 has been replaced in the control system of this disclosure by transmission gear selector valve 450. This valve comprises a multiple land valve spool 452 having spaced valve lands 454, 456, 458 and 460. These are slidably situated in a valve chamber 462 which has internal valve lands that register with the external valve lands of the valve spool 452.

Valve sleeve 462 surrounds land 460. It is formed with an internal shoulder 464 against which valve spring seat 466 is positioned. Valve spring 468 urges the seat 466 in a left-hand direction thereby applying a centering force on the valve spool 452. The center position for the valve spool 452 is defined by the shoulder 464.

Valve plate 478 encloses the right-hand end of the valve chamber 462 and defines in the region of the spring 568 a pressure signal chamber that is in fluid communication with the passage 150 through a control orifice 480.

The left-hand side of the chamber 462 is closed by orifice plate 482. This defines a pressure chamber that is in fluid communication with the passage 150 through a control orifice 484. An orifice 486 is formed in the plate 482. A solenoid valve element 488 registers with the orifice 486 and normally closes it. Solenoid windings 490 can be energized electrically by a suitable switching circuit. When they are energized, the valve element 488, which is connected to or formed as a part of a solenoid core, pulls away from the orifice 486 thereby venting the pressure chamber on the left-hand side of the valve spool 452. Valve spring 492 urges the valve spool 452 in a right-hand direction.

Plate 478 also is formed with an orifice as shown at 494. A second solenoid valve element 496 registers with the orifice 494. Solenoid windings 498, which are under the control of the driver controlled switching circuit, draw valve element 496 away from the orifice 494 when they are energized thereby venting the pressure chamber on the right-hand side of the valve element 452.

The braking downshift control valve shown at 500 comprises spaced valve lands 502, 504, 506 and 508. These are slidably situated in the valve chamber 510 which has internal valve lands which register with the lands of valve element 500. Valve spring 512 urges the valve 500 in a right-hand direction. The diameter of land 508 is slightly larger than the diameter of land 506.

Passage 182, which is pressurized when the transmission is conditioned for forward drive, automatic drive range operation, communicates with the valve chamber 510 at a location intermediate lands 502 and 504. Passage 514 communicates with the chamber 510 at a location adjacent land 504. This passage extends to the gear selector valve chamber 462 and communicates with it at a location intermediate lands 458 and 460. An exhaust port 516 is siutated in the chamber 461 adjacent passage 514. A corresponding exhaust port 518 is located at the other end of the valve spool 452 adjacent land 454.

Passage 176 which is pressurized with control when the gear selector valve is conditioned for reverse drive operation or low speed-ratio operation, communicates with the chamber 510 at a location intermediate lands 504 and 506. Passage 106, which is in communication with the fluid pressure source directly, communicates with the left-hand end of the valve chamber 510, which is closed by valve plate 520. Passage 106 communicates also with the valve chamber 510 at a location adjacent land 508. The annular space between lands 506 and 508 is a fluid communication with annular groove 522 in the chamber 510 at a location adjacent land 506.

The right-hand end of the valve chamber 510 is closed by closure member 524 to define a pressure chamber. This chamber is in fluid communication with the passage 106 through a control orifice 526. A solenoid control orifice 528 communicates with the pressure chamber on the right-hand side of the land 508. This orifice is controlled by a solenoid valve element 530 which registers with the orifice 528 to close the same.

Solenoid windings 532, which can be energized by a suitable switching circuit, causes valve element 530 to withdraw from the orifice 528 when they are energized with a controlled voltage.

A valve pilot piston 534 is slidably situated in a pilot cylinder 536 in cooperation with the cylinder to define a pressure cavity that is in fluid communication with control pressure passage 538. An extension of the piston 534 is slidably situated in a cooperating opening in the closure member 524 and is adapted to engage the right-hand side of the valve 500. When the passage 538 is pressurized, valve 500 is shifted in the left-hand direction to the position shown in FIG. 3. When it is in that position, passage 540, which communicates with the annulus 522, is exhausted through exhaust port 542.

Passage 538 communicates with the throttle downshift valve 544, which comprises valve element 546 having spaced valve lands 548 and 560. Valve element 546 is biased in a left-hand direction by valve spring 562. Exhaust port 564 communicates with the valve chamber for the valve element 546 at a location intermediate lands 548 and 560. The passage 538 is blocked by land 548 when the valve element 546 assumes the position shown. This interrupts communication between passage 182 and passage 538.

The valve element 546 is connected to the accelerator pedal 566 so that it is shifted upon movement of the accelerator pedal 566 to a position intermediate the closed throttle position and the wide-open throttle position of the engine carburetor linkage. Passage 182 is not brought into communication with the control pressure passage 282 until the accelerator pedal is moved to a position corresponding to the wide-open throttle position. The downshift valve thus functions in a manner similar to that described with reference to the downshift valve of co-pending application S.N. 518,882. During initial movement of the accelerator pedal, however, passage 538 immediately becomes pressurized thereby introducing a pressure signal to the right-hand side of the braking downshift control valve. Thus pressure is used in lieu of a pressure signal that is proportional in magnitude to the engine intake manifold pressure. The passages 106, 184, 150, 142 and 182 distribute control pressure to the various regions of the control circuit in the same manner described with reference to the corresponding passages of the co-pending disclosure of S.N. 518,822. Reference may be had to that disclosure for the purposes of supplementing this disclosure.

The transmission gear selector is capable of establishing a neutral condition, a reverse drive condition and a forward drive automatic drive range condition. The neutral position of the selector is shown in FIG. 3. The reverse drive position for the valve 450 is obtained as the solenoid valve element 488 is moved away from the orifice 486. This exhausts the pressure on the left-hand side of the valve element 452 so that the pressure on the downstream side of the control orifice 480 shifts the valve 450 in a left-hand direction. At that time exhaust port 516 is blocked by land 460, and control pressure from passage 150 is distributed to the passage 142 through cross-over passage 566. The pressure in passage 142 is distributed to the main regulator valve to produce an augmentation in the circuit pressure in the manner described in the co-pending disclosure. At the same time, passage 514 becomes pressurized. This pressure is distributed to passage 176 through the braking downshift control valve. Passage 176 in turn communicates with the 1–2 shift valve. That valve establishes communication between passage 176 and the brake. At the same time, the reverse clutch is pressurized since it communicates with the pressurized passage 142 through the 2–3 shift valve.

If the reverse drive solenoid windings 490 are de-energized and the forward drive solenoid windings 498 are energized, control orifice 494 becomes open to exhaust. This creates a pressure imbalance on valve element 452 which shifts it in a right-hand direction. At that time, passage 142 is exhausted through exhaust port 516. At the same time, control pressure is distributed from passage 150 to passage 184 through the gear selector valve 450. Passage 184 in turn communicates with passage 182 which establishes the automatic drive range condition. The braking down shift control valve has no influence under these conditions. If the operator energizes the solenoid windings 532, the pressure on the right-hand side of the downshift control valve 500 is exhausted thereby causing the valve 500 to shift in a right-hand direction. This causes passage 182, which is the feed passage for the 2–3 shift valve, to be exhausted through passage 514 and through the open exhaust port 516 in the gear selector valve 450. The transmission then assumes an intermediate speed-ratio condition since the direct drive clutch is exhausted and the intermediate servo brake band becomes applied because of the release of pressure from the applied side of the intermediate brake servo 54.

After the valve 500 is shifted in a right-hand direction, the pressurized passage 106 distributes pressure to the differential area defined by lands 506 and 508. Thus, the additional pressure causes the valve 500 to be retained in the right-hand position regardless of the action of the solenoid valve element 530. As soon as the vehicle operator begins to open engine carburetor throttle, however, a signal is made available to passage 538 which pressurizes the pilot piston 534 thereby shifting the downshift control valve 500 in a left-hand direction to render it inactive.

The solenoid winding 532 can be energized by the vehicle operator by closing a switch in the vehicle control panel. It is not necessary to maintain the winding 532 in a continuouly energized condition for the reasons explained in the foregoing paragraphs.

In a similar fashion, the gear selector valve 450 is shifted in a right-hand direction as the solenoid windings 498 are energized. It is held in that position independently of the solenoid windings, however, because of the presence of control pressure acting on the differential area of lands 454 and 456. In a smiliar fashion, if the gear selector valve 450 is shifted in a left-hand direction, it is held in that left-hand position regardless of the action solenoid windings 490 because of the presence of the pressure acting on the differential area of lands 458 and 460.

In FIG. 4 there is shown an accumulator valve and a governor pressure differentiating valve. These are identified, respectively, by reference characters 600 and 602. The accumutalor valve comprises an accumulator cylinder 604 in which is positioned an accumulator piston 606. The piston 606 and the cylinder 604 cooperate to define a pressure chamber that is in fluid communication with governor pressure passage 200. Movement of the piston 606 in a right-hand direction is resisted by accumulator spring 608.

Piston 606 carries the pilot piston 610 which is slidably situated in a control cylinder 612 of relatively reduced diameter.

The right-hand end of the cylinder 612 is in fluid communication with passage 200 through a control orifice 614.

The governor pressure differentiating valve 602 comprises a movable valve element 616 slidably situated in a valve chamber 618, which may form an extension of the cylinder 612. Valve element 616 is urged in a left-hand direction by valve spring 620. The chamber occupied by the spring 620 is in fluid communication with the downstream side of the orifice 614. An exhaust port 622 communicates with the chamber 618 intermediate the lands 624 and 626 of the valve element 616. The right-hand side of the pressure chamber for the downshift control valve 500 is in fluid communication with the governor pressure differentiating valve through signal passage 628.

If the vehicle is coasting at a relatively constant speed that is of sufficient magnitude to develop a pressure in the accumulator valve to overcome the force of the spring 608, the piston 606 will maintain a balanced position. If the vehicle speed should increase during coasting as it would when it is coasting down a relatively step incline, the governor pressure will increase. This results in shifting movement of the piston 606 thereby displacing fluid from the cylinder 612. This fluid flow creates a pressure across the orifice 614. If the pressure drop is sufficiently high, the valve element 616 will be shifted in a right-hand direction under the influence of the pressure differential. This then will exhaust passage 628 through exhaust port 622. This has the same effect as if the solenoid windings 532 of the solenoid control valve element 530 were to be energized. This will cause shifting movement of the braking downshift control valve in a right-hand direction in the manner previously described thereby initiating a forced downshift of the transmission system to the intermediate speed ratio. This increases the engine braking, thereby tending to retard continued acceleration of the vehicle while coasting. The braking downshift control valve will be held in the right-hand position by reason of the action of the pressure on the differential area of lands 506 and 508 regardless of whether acceleration during coasting continues.

Braking downshift control valve 500 is shifted again in a left-hand direction as the vehicle operator again opens the engine carburetor throttle to pressurize passage 538 in the manner previously described.

Having thus described preferred forms of my invention, what I claim and desire to secure by United States Letters Patents is:

1. In a wheeled vehicle, a control system for an automatic power transmission mechanism having multiple ratios and gear elements adapted to define plural torque delivery paths between a driving member and a driven member, clutch and brake means for controlling the relative motion of said gear elements to establish any one of several speed ratios, a source of a first pressure signal that is proportional in magnitude to the driven speed of said driven member, a second pressure signal source adapted to develop a second pressure signal that is sensitive to the torque applied to said driving member, a control pressure source, servo means for actuating and releasing said clutch and brake means, conduit structure including fluid pressure distributor valve means for connecting said control pressure source and said servo means, said first pressure signal imposing on said distributor valve means a ratio upshifting tendency which is opposed by said second pressure signal, a transmission gear selector valve means situated in said conduit structure between said pressure source and said distributor valve means for controlling the distribution of control pressure to the latter thereby establishing automatic ratio changing operating modes, a braking downshift control valve means in fluid communication with said selector valve means and with a high pressure region of said system, a passage extending from said braking downshift control valve means to said distributor valve means, said braking downshift control valve means comprising a valve chamber communicating with said passage, a shiftable valve element in said valve chamber having a valve element adapted to register with said passage when it assumes one position thereby blocking distribution of pressure thereto and to open said passage to pressure from said pressure region when it assumes a second position, and a personally controllable braking pressure signal source in fluid communication with said valve chamber whereby a braking pressure signal can be distributed to said valve element to shift the same thereby imposing on said distributor valve means a downshifting tendency to augment coast braking as said driven member drives said driving member.

2. In a wheeled vehicle, a control system for an automatic power transmission mechanism having multiple ratios and gear elements adapted to define plural torque delivery paths between a driving member and a driven member, clutch and brake means for controlling the relative motion of said gear elements to establish any one of several speed ratios, a source of a first pressure signal that is proportional in magnitude to the driven speed of said driven member, a second pressure signal source adapted to develop a second pressure signal that is sensitive to the torque applied to said driving member, a control pressure source, servo means for actuating and releasing said clutch and brake means, conduit structure including fluid pressure distributor valves for connecting said control pressure source and said servo means, said first pressure signal imposing on said distributor valve means a ratio upshifting tendency which is opposed by said second pressure signal, a transmission gear selector valve means situated in said conduit structure between said pressure source and said distributor valve means for controlling the distribution of control pressure to the latter thereby establishing automatic ratio changing operating modes, a braking downshift control valve means in fluid communication with said selector valve means and with said control pressure source, a passage extending from said braking downshift control valve means to said distributor valve means, said braking downshift control valve means comprising a valve chamber communicating with said passage, a shiftable valve element in said valve chamber having a valve element adapted to register with said passage when it assumes one position thereby blocking distribution of pressure thereto and to open said passage to control pressure from said pressure source when it assumes a second position, and a personally controllable braking pressure signal source in fluid communication with said valve chamber whereby a braking pressure signal can be distributed to said valve element to urge the same normally to a passage opening position thereby imposing on said distributor valve means a downshifting tendency to augment coast braking as said driven member drives said driving member.

3. The combination as set forth in claim 1 wherein said passage extending from said personally controllable downshift signal comprises a branch passage extending from a high pressure region of said conduit structure to one side of said shiftable valve element, a flow restricting orifice in said branch passage, a control orifice between said flow restricting orifice and said shiftable valve element, and a personally operable valve having a valve element movable into and out of registry with respect to said control orifice whereby pressure build-up can be created in said valve chamber to urge said shiftable valve element to a downshift position.

4. The combination as set forth in claim 2 wherein said passage extending from said personally controllable downshift signal comprises a branch passage extending from a high pressure region of said conduit structure to one side of said shiftable valve element, a flow restricting orifice in said branch passage, a control orifice between said flow restricting orifice and said shiftable valve element, and a personally operable valve having a valve element movable into and out of registry with respect to said control orifice whereby pressure build-up can be created in said valve chamber to urge said shiftable valve element to a downshift position.

5. The combination as set forth in claim 1 wherein said personally operable valve comprises an electrical solenoid, solenoid windings associated with said valve element which, when energized, retract said valve element from said control orifice, and personally operable means for energizing said solenoid windings as the vehicle is braked.

6. The combination as set forth in claim 2 wherein said personally operable valve comprises an electrical solenoid, solenoid windings associated with said valve element which, when energized, retract said valve element from said control orifice, and personally operable means for energizing said solenoid windings as the vehicle is braked.

7. The combination as set forth in claim 1 wherein said braking downshift signal source comprises a governor pressure differentiating valve in fluid communication with said first signal source, a signal passage extending from said differentiating valve to said braking downshift control valve, a differentiating valve orifice, a fluid accumulator having a movable accumulator piston one side of which communicates with said first signal source, the other side of said piston communicating with one side of said differentiating valve orifice, spring means for resisting movement of said piston in response to increases in the value of said speed signal, one side of said differentiating valve communicating with said one side of said differentiating valve orifice, said differentiating valve responding to a pressure differential across said differentiating valve orifice to control selectively distribution of a braking downshift control valve signal to said downshift control valve means.

8. The combination as set forth in claim 7 wherein said differentiating valve means comprises an exhaust orifice, one side of said differentiating valve communicating with one side of said control orifice and the other side thereof communicating with the other side of said control orifice, said speed signal normally urging said differentiating valve to a position which interrupts communication between said passage and said exhaust port, the pressure differential across said control orifice being effective to shift said differentiating valve to a passage exhausting position when said accumulator piston strokes under the influence of said speed signal at a rate that corresponds to a predetermined rate of acceleration of said driven member during coasting braking of said vehicle.

9. In a wheeled vehicle, a control system for an automatic power transmission mechanism having multiple ratios and gear elements adapted to define plural torque delivery paths between a driving member and a driven member, clutch and brake means for controlling the relative motion of said gear elements to establish any one of several speed ratios, a source of a first pressure signal that is proportional in magnitude to the driven speed of said driven member, a second pressure signal source adapted to develop a second pressure signal that is sensitive to the torque applied to said driving member, a control pressure source, servo means for actuating and releasing said clutch and brake means, conduit structure including fluid pressure distributor valves for connecting said control pressure source and said servo means, said first pressure signal imposing on said distributor valve means a ratio upshifting tendency which is opposed by said second pressure signal, a transmission gear selector valve means situated in said conduit structure between said pressure source and said distributor valve means for controlling the distribution of control pressure to the latter thereby establishing automatic ratio changing operating modes, a braking downshift control valve means in fluid communication with said selector valve means and with said control pressure source, a passage extending from said braking downshift control valve means to said distributor valve means, said braking downshift control valve means comprising a valve chamber communicating with said passage, a shiftable valve element in said valve chamber having a valve element adapted to register with said passage when it assumes one position thereby blocking distribution of pressure thereto and to open said passage to control pressure from said pressure source when it assumes a second position, and a personally controllable braking pressure signal source in fluid communication with said valve chamber whereby a braking pressure signal can be distributed to said valve element to urge the same normally to a passage opening position thereby imposing on said distributor valve means a downshifting tendency to augment coast braking as said driven member drives said driving member, and personally operable downshift valve means communicating with said pressure source and with said braking downshift control valve for distributing a signal to the latter in response to a downshift demand for driving torque.

10. The combination as set forth in claim 1 wherein said passage extending from said personally controllable downshift signal comprises a branch passage extending from a high pressure region of said conduit structure to one side of said shiftable valve element, a flow restricting orifice in said branch passage, a control orifice between said flow restricting orifice and said shiftable valve element, and a personally operable valve having a valve element movable into and out of registry with respect to said control orifice whereby pressure build-up can be created in said valve chamber to urge said shiftable valve element to a downshift position, and personally operable downshift valve means communicating with said pressure source and with said braking downshift control valve for distributing a signal to the latter in response to a downshift demand for driving torque.

11. The combination as set forth in claim 2 wherein said personally operable valve comprises an electrical solenoid, solenoid windings associated with said valve element which, when energized, retract said valve element from said control orifice, and personally operable means for energizing said solenoid windings as the vehicle is braked, and personally operable downshift valve means communicating with said pressure source and with said braking downshift control valve for distributing a signal to the latter in response to a downshift demand for driving torque.

References Cited
UNITED STATES PATENTS

| | | | |
|---|---|---|---|
| 2,893,261 | 7/1959 | Flinn | 74—869 |
| 3,003,368 | 10/1961 | Winchell | 74—752 |
| 3,056,313 | 10/1962 | Lindsay | 74—752 |
| 3,083,589 | 4/1963 | Knowles et al. | 74—677 |
| 3,142,999 | 8/1964 | Searles et al. | 74—868 |
| 3,167,970 | 2/1965 | Wagner et al. | 74—869 |
| 3,398,607 | 8/1968 | Chana | 74—864 |

ARTHUR T. McKEON, Primary Examiner

U.S. Cl. X.R.

74—752, 763